United States Patent Office 2,864,741
Patented Dec. 16, 1958

2,864,741

DI (ALKYLMERCAPTO) SUBSTITUTED VINYL, DIALKYL PHOSPHATE AND THIOPHOSPHATE INSECTICIDES

William R. Diveley, Newark, Del., assignor to Hercules Powder Company, Wilmington, Del., a corporation of Delaware No Drawing. Application December 30, 1957
Serial No. 705,799

13 Claims. (Cl. 167—22)

This invention relates to new and useful organic phosphorus compounds and to pesticidal compositions containing the same.

The novel organic phosphorus compounds of this invention have the general formula:

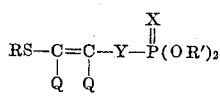

in which R and R' represent lower alkyl radicals and X and Y are selected from the group consisting of oxygen and sulfur and one Q is SR and the other is H.

These organic phosphorus compounds have pesticidal properties and distinguish themselves in being highly toxic to insects and mites at low concentrations and in having a low residual toxicity life. This latter property gives the pesticides of this invention a possible advantage over other pesticides in that garden crops may be treated with them with less danger due to residues.

The compounds of this invention are made by a method expressed by one of the following equations:

(1) 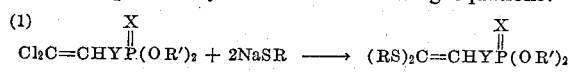

(2) 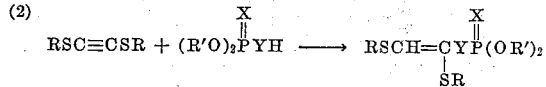

in which formulas R and R' are lower alkyl groups and X and Y are members of the group of sulfur and oxygen. The preparation according to Equation 1 is preferred when X and Y are both oxygen and the method according to Equation 2 is preferred when X and Y are both S.

These methods of preparation are more particularly described by the following examples which also show and describe the manner in which the products are used as pesticides. All parts and percentages are by weight.

Example 1

To a cooled solution of 224 parts potassium hydroxide in 2200 parts absolute ethanol was added 248 parts ethanethiol dropwise with stirring and cooling to hold the temperature at 30° C. When this addition was complete, the temperature was lowered to 5° C. and 498 parts 2,2-dichlorovinyl diethyl phosphate (prepared according to J. F. Allen and O. H. Johnson, J. Am. Chem. Soc. 77, 2871 (1955) by the reaction of chloral with triethyl phosphite) was added dropwise with stirring over a 30-minute period while cooling to keep the temperature in the range of 30-50° C. When no further heat was evolved, the reaction mixture was heated at 45-50° C. for 20 minutes. The potassium chloride which separated was removed by filtration and the solvent was distilled off under reduced pressure. The residue was poured into 1,000 parts of water, taken up in ether and washed with 500 parts water in two portions. The ether extract was dried over sodium sulfate, the ether was evaporated, and the residue was distilled in vacuo to recover 232 parts 2,2-bis(ethylthio)vinyl diethyl phosphate B. P. 131–137°/ 0.3 mm. Hg which analyzed: Cl, 0.4%; S, 21.7%; P, 10.8%; $n_D^{20}$=1.4935; U. V. absorption maximum 255 m$\mu$; mol. wt. (acetone ebullioscopic method) 272. Hydrolysis of this product in the presence of 2,4-dinitrophenylhydrazine hydrochloride, hydrochloric acid and mercuric chloride resulted in the formation of the 2,4-dinitrophenyl osazone of glyoxal, indicating that the ethylthio groups were both on the $\beta$-carbon as shown by the equation.

Example 2

To a stirred mixture of 4.9 parts 1,2-bis(ethylthio) ethyne (prepared according to the method of H. Baganz and W. Friebsch Chem. Ber., 89, 895 (1956)) dissolved in 45 parts benzene was added dropwise with stirring at room temperature (25° C.) 6.2 parts O,O-diethyl hydrogen phosphorodithioate over a 5-minute period. The temperature rose to about 30° C. After 3 hours at 30–40° C., the mixture was poured into 250 parts brine solution and neutralized with enough sodium hydroxide to give a pH of 9. The organic layer was separated and purified by further washing as in Example 1 but without distilling after removal of the solvent. The resulting 1,2 - bis(ethylthio)vinyl-O,O-diethyl phosphorodithioate amounting to 8.0 parts had the following analysis: S, 38.7%; P, 8.8%; $n_D^{20}$=1.5643.

Example 3

38.7%; P, 8.8%; $n_D^{20}$=1.5643.
pared according to the method of Example 1 was substantially equivalent to toxicity to the product of Example 1 against Mexican bean beetles.

Example 4

1,2-bis(butylthio)vinyl O,O-diethyl phosphorodithioate prepared according to the method of Example 2 was lower in toxcity compared to the product of Example 2 against Mexican bean beetles.

Example 5

2,2-bis(methylthio)vinyl O,O-diethyl phosphate prepared according to Example 1 had greater systemic activity than the product of Example 1.

An emulsifiable concentrate of each product was made by mixing 1 gram of the toxicant of each of Examples 1–5 with 1 ml. benzene and 1 ml. sorbitan monolaurate polyoxyalkylene derivative (Tween 20). This concentrate was then diluted with water to form dispersions of the residue in water varying in concentration from 1.0% to 0.0005%. The dispersions were then tested for their toxicity to caged insects and to mites not only by spraying the pests but by spraying the plants and infesting these plants with pests from time to time for the purpose of determining residual toxicity. Standard test methods were used for obtaining toxicity and residual activity.

When tested on pea plants infested with pea aphids, the product of Example 1 showed 100% kill with an emulsion containing 0.005% or more toxicant while the product of Example 2 showed 80% kill with an emulsion containing 0.005% toxicant. When tested against the two-spotted spider mite, the products of both Examples 1 and 2 showed 100% kill with a 0.005% emulsion and the product of Example 1 showed 95% kill and the product of Example 2 showed 100% kill at 0.0005% concentration.

The product of Example 3 was equivalent to the product of Example 1 at 0.005% concentration against two-spotted spider mites and the product of Example 4 had lower toxicity than the product of Example 2 at 0.005% concentration against the two-spotted spider mite.

In residual toxicity tests it was shown that plants sprayed with the product of Example 1 had slightly less than toxicity 5 hours after spraying but showed no toxicity after about 20 hours after spraying. Further tests showed no pesticidal toxicity after 24 hours on plants sprayed with 0.005% emulsions of this toxicant.

The most effective compounds of this invention as insecticides are those in which the lower alkyl groups are none higher than 4 carbon atom alkyls and the best contains no more than 2 carbon atoms per alkyl group. The preferred compounds are those in which all of the lower alkyl groups are methyl and ethyl groups and X and Y are different from each other.

The compounds in which the alkylthio groups are on the same carbon atoms are preferred from the standpoint of relative toxicity as well as from the standpoint of ease of preparation.

A further highly advantageous property of the compounds of this invention is the quick knockdown and quick kill which they exhibit.

In producing the compounds of this invention by the method of Example 1, the reaction is carried out by heating the two reactants at a temperature at which reaction takes place but below the decomposition temperature in the range of 0° to 125° C., preferably in the range of 0° to 75° C. The reactants may be mixed in any desired order. In order to get complete reaction, it is preferable to use an excess over the theoretical amount of the mercaptide. When the reaction is complete, the excess is readily removed by washing with water.

The reaction is best carried out in a non-aqueous solution or suspension. Organic solvents are desirable to aid in control of the reaction. Suitable solvents include benzene, toluene, xylene, cyclohexane, hexane, anhydrous alcohol solvents and dioxane.

In the process of Example 2 the preparation of 1,2-bis (alkylthio)ethyne is well described for the case where alkyl is ethyl (l. c.) The process where alkyl is methyl to butyl is essentially the same except for the substitution of the proper alkanethiol in the process.

The methods by which the products of this invention are isolated will vary slightly with the reactants used and the product produced. Further purification by selective solvent extraction or by adsorptive agents such as activated carbon, or clays, can precede the removal of the solvent. Likewise, an organic solvent can be added to aid in the purification by adsorptive agents. However, the product is generally satisfactory for use as a pesticide without further purification.

The compounds of this invention are used as the sole toxic agent in pesticidal formulations or in admixture with other toxicants for modification of the properties of the individual toxicants. They may be used, for example, in admixture with toxaphene, DDT, Thanite, chlordane, rotenone, pyrethrum, and the like in many of the formulations suggested below.

The compounds of this invention are made into pesticidal compositions for use against insects and mites by dilution with an insecticidal adjuvant as a carrier therefor, by dispersing in organic solvent, or in water, or by diluting with a solid insecticidal adjuvant as a carrier. Dispersions containing a surface-active dispersing agent have the advantage of spreading the toxic substance more effectively over the plant surface. Dispersions in organic solvents include dispersions in alcohols, pine oil, hydrocarbon solvents, difluorodichloromethane, and similar organic solvents. The compounds of this invention are also used in aerosol formulations in which difluorodichloromethane and similar aerosol propellants form the propellant vehicle.

Aqueous dispersions are made up from the compounds of this invention, a surface-active dispersing agent and water as the essential ingredients. The amount of the compounds of this invention in the aqueous dispersions when diluted for spraying of plants will be in the range of about 10% to about 0.001% of the aqueous dispersion.

The aqueous dispersion will ordinarily be made up from a concentrate, and the concentrate will be dispersed in water to the proper concentration for application to the plants to be treated in the field. The concentrate is composed essentially of the compound of this invention and a surface-active dispersing agent. The concentrate may also contain sufficient amounts of organic solvents to aid in effective dispersion. The amount of surface-active dispersing agent used is usually at least 5% of the amount of toxic compound in the concentrate.

Suitable surface-active dispersing agents for use in the compositions of this invention are those disclosed in "Chemistry of Insecticides, Fungicides, and Herbicides," (Donald E. H. Frear, second edition (1948), pages 280–287) for use with known insecticides and include neutral soaps of resin, alginic and fatty acids and alkali metals or alkyl-amines or ammonia, saponins, gelatins, milk, soluble casein, flour and soluble proteins thereof, sulfite lye, lignin pitch, sulfite liquor, long-chain fatty alcohols having 12–18 carbon atoms and alkali metal salts of the sulfates thereof, salts of sulfated fatty acids, salts of sulfonic acids, esters of long-chain fatty acids and polyhydric alcohols in which alcohol groups are free, clays such as fuller's earth, china clay, kaolin, attapulgite, and bentonite and related hydrated aluminum silicates having the property of forming a colloidal gel. Among the other surface-active dispersing agents which are useful in the compositions of this invention are the omega-substituted polyethylene glycols of relatively long-chain length, particularly those in which the omega substituent is aryl, alkyl, or acyl. Compositions of the toxic material and surface-active dispersing agent will in some instances have more than one surface-active dispersing agent for a particular type of utility, or in addition to a surface-active dispersing agent, hydrocarbons such as kerosene and mineral oil will also be added as improvers. Thus, the toxic material may contain a clay as the sole adjuvant or clay and hydrocarbon, or clay and another surface-active dispersing agent to augment the dispersing action of the clay. Likewise, the toxic material may have water admixed therewith along with the surface-active dispersing agent, sufficient generally being used to form an emulsion. All of these compositions of toxic material and surface-active dispersing agent may contain in addition synergists and/or adhesive or sticking agents.

What I claim and desire to protect by Letters Patent is:

1. A compound of the formula

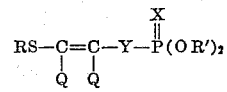

in which R and R' represent lower alkyl radicals, X and Y are selected from the group consisting of oxygen and sulfur, and one Q is SR and the other is H.

2. A compound of the formula

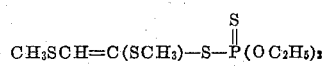

3. A compound of the formula

4. A compound of the formula

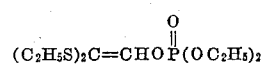

5. A compound of the formula

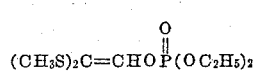

6. An insecticide composition comprising a compound of claim 1 and an insecticide adjuvant as a carrier therefor.

7. An insecticide composition comprising a compound of claim 2 and an insecticide adjuvant as a carrier therefor.

8. An insecticide composition comprising a compound of claim 3 and an insecticide adjuvant as a carrier therefor.

9. An insecticide composition comprising a compound of claim 4 and an insecticide adjuvant as a carrier therefor.

10. An insecticide composition comprising a compound of claim 5 and an insecticide adjuvant as a carrier therefor.

11. The method of preparing a compound of the formula $$(RS)_2C=CHY-\overset{X}{\underset{\|}{P}}(OR')_2$$

which comprises contacting a compound of the formula $$Cl_2C=CHY-\overset{X}{\underset{\|}{P}}(OR')_2$$

with two molecular proportions of a compound of the formula MeSR at a temperature in the range of 0 to about 100° C. until substantially all of the chlorine is replaced by SR, in said formulas R and R' representing lower alkyl radicals, X and Y representing an element of the group consisting of sulfur and oxygen and Me representing an alkali metal.

12. The method of preparing a compound of the formula $$(C_2H_5S)_2-C=CH-O\overset{O}{\underset{\|}{P}}(OC_2H_5)_2$$

which comprises contacting a compound of the formula $$Cl_2C=CH-O\overset{O}{\underset{\|}{P}}(OC_2H_5)_2$$

with two molecular proportions of a compound of the formula $MeSC_2H_5$ at a temperature in the range of about 0 to about 100° C. until substantially all of the chlorine is replaced by $C_2H_5S$, in said formulas Me representing an alkali metal.

13. The method of preparing a compound of the formula $$(CH_3S)_2-C=CHO\overset{O}{\underset{\|}{P}}(OC_2H_5)_2$$

which comprises contacting a compound of the formula $$Cl_2C=CHO\overset{O}{\underset{\|}{P}}(OC_2H_5)_2$$

with two molecular proportions of a compound of the formula $MeSCH_3$ at a temperature in the range of about 0 to about 100° C. until substantially all of the chlorine is replaced by $CH_3S$, in said formulas Me representing an alkali metal.

No references cited.

UNITED STATES PATENT OFFICE

Certificate of Correction

December 16, 1958

Patent No. 2,864,741

William R. Diveley

It is hereby certified that error appears in the printed specification of the above numbered patent requiring correction and that the said Letters Patent should read as corrected below.

Column 2, line 29, Example 3, strike out "38.7%; P, 8.8%; $n_D^{20}=1.5643$." and insert instead —2,2-bis(propylthio)vinyl O,O-diethyl phosphate pre-—; column 3, line 2, strike out "than".

Signed and sealed this 7th day of April 1959.

[SEAL]

Attest:
KARL H. AXLINE,
Attesting Officer.

ROBERT C. WATSON,
Commissioner of Patents.